Figure 1:
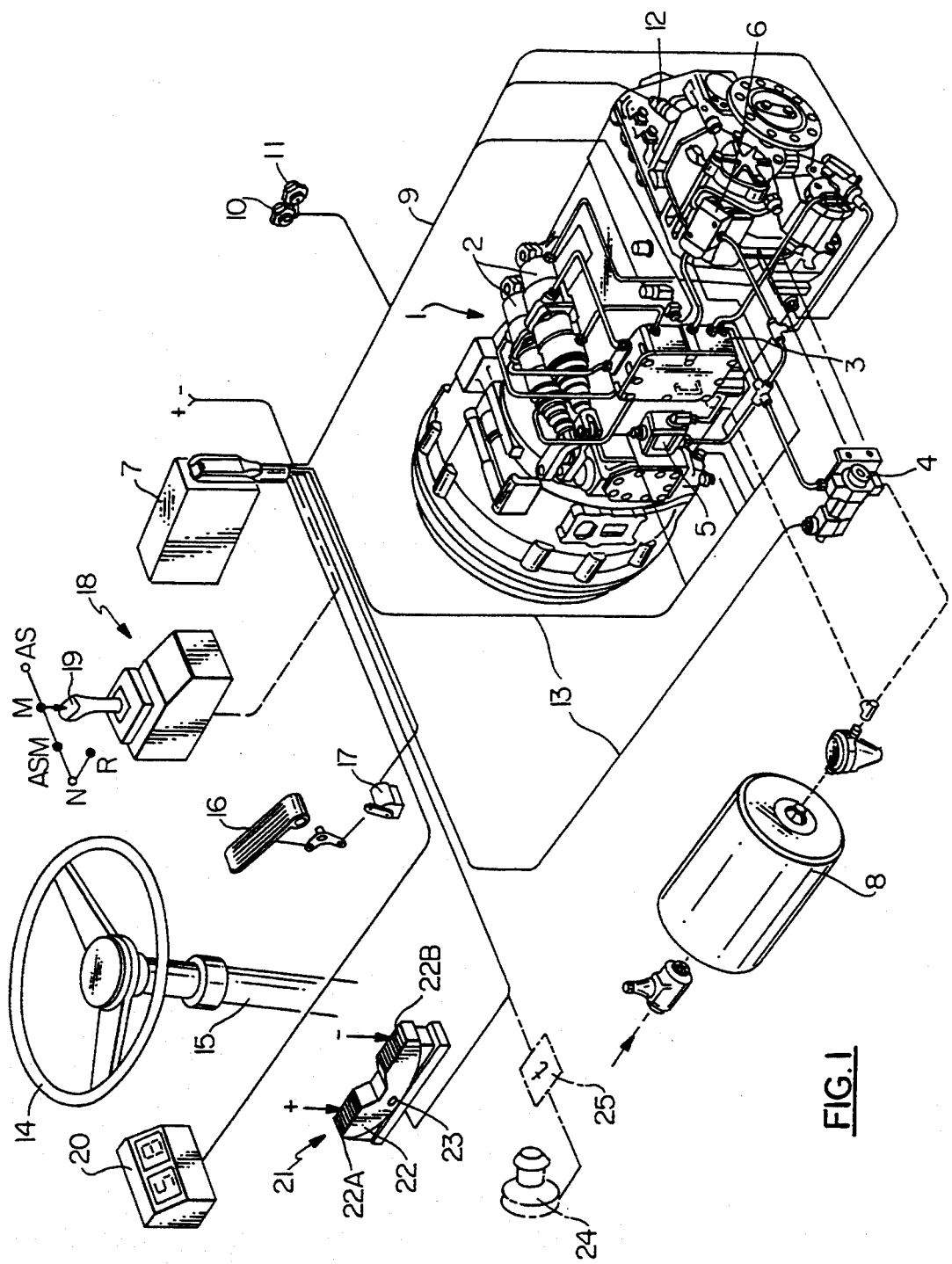

United States Patent [19]

Schwab et al.

[11] Patent Number: 5,419,412
[45] Date of Patent: May 30, 1995

[54] GEAR-SHIFT CONTROL AND GEAR-RANGE SELECTOR FOR A SEMI-AUTOMATIC OR FULLY-AUTOMATIC MOTION VEHICLE GEARBOX

[75] Inventors: Manfred Schwab; Klaus Schweiger, both of Friedrichshafen, Germany

[73] Assignee: Zahnradfabrik Friedrichshafen AG, Germany

[21] Appl. No.: 90,051

[22] PCT Filed: Jan. 21, 1992

[86] PCT No.: PCT/EP92/00118

§ 371 Date: Jul. 15, 1993

§ 102(e) Date: Jul. 15, 1993

[87] PCT Pub. No.: WO92/13215

PCT Pub. Date: Aug. 6, 1992

[30] Foreign Application Priority Data

Jan. 22, 1991 [DE] Germany .................. 41 01 672.6

[51] Int. Cl.$^6$ ...................... B60K 20/04; B60K 41/22
[52] U.S. Cl. .................... 180/336; 477/81; 477/79; 74/335
[58] Field of Search .......... 180/336; 74/474, 481, 74/335; 192/0.073, 0.092; 477/79, 81

[56] References Cited

U.S. PATENT DOCUMENTS 5,022,509 6/1991 Schweiger ................ 477/81
5,197,344 3/1993 Maier et al. ............. 74/335

FOREIGN PATENT DOCUMENTS 0121167 10/1984 European Pat. Off. .
0250333 12/1987 European Pat. Off. ............ 180/336
0353310 2/1990 European Pat. Off. .
3717675 12/1988 Germany .
4006653 9/1990 Germany .
3924318 1/1991 Germany ........................... 180/336

OTHER PUBLICATIONS

SAE Technical Paper Series 831776 "Automated Mechanical Transmission Controls"–Nov. 7 to 19, 1983, pp. 2, 6, and 7.

*Primary Examiner*—Margaret A. Focarino
*Assistant Examiner*—Peter C. English
*Attorney, Agent, or Firm*—Davis, Bujold & Streck

[57] ABSTRACT

In a motor vehicle having a transmission (1) which can be optionally operated fully automatically or semi-automatically, and in which a gear-range selector (18) and a gear-shift control (21) are provided. The gear-range selector makes it possible to pre-select a travel speed in which the transmission is gradually shifted up or down by actuating the gear-shift control (21). The gear-shift control (21) is designed as a foot switch (22, 24) located in the foot area of a driver's cab of the motor vehicle, so that both of the driver's hands can stay on the steering wheel while these gear-shift operations are being carried out thereby permitting the driver to concentrate fully on the traffic.

12 Claims, 1 Drawing Sheet

GEAR-SHIFT CONTROL AND GEAR-RANGE SELECTOR FOR A SEMI-AUTOMATIC OR FULLY-AUTOMATIC MOTION VEHICLE GEARBOX

The invention concerns a gear and gear-range selector for a semi-automatic or fully automatic motor vehicle transmission wherein a speed range is adjustable by means of the gear-range selector, in which the transmission can be manually shifted up or down by a single gear speed via the gear-shift control.

DE-A 40 06 653 has disclosed a gear and gear-range selector of the above mentioned kind. The gear-range selector with which the driver can pre-select different shifting cycles such as a fully automatic operation, a manual operation, a reverse travel position, a neutral position, etc., is optionally designed as a rotary or push-button switch. The gear-shift control, through which the driver transmits shift commands to an electronic control unit in the manual or semi-automatic operation of the transmission, is designed as a steering column selector or as a manually operable console selector. The gear most favorable for the traveling condition concerned is determined by the control unit from the speed, the load and the acceleration values combined with an engine performance graph and optically indicated to the driver. By actuating the gear-shift control into a first plane of motion, the driver releases the shift of the recommended gear. If the driver moves the gear-shift control to a second plane of motion, which extends across the first plane of motion, manual upshifts and downshifts of the transmission are released by a single gear speed. In addition, reverse shifts of the transmission can also be released by means of a kick-down switch provided on the acceleration pedal. The disadvantage of this device consists in that the operation of the gear-shift control designed as a steering wheel or console switch makes special attentiveness of the driver necessary, it being impossible for both hands to stay on the steering wheel.

Therefore, the problem to be solved by this invention is to provide a gear and gear-range selector which is easy to operate and enables the driver to fully concentrate on the traffic.

In a gear and gear-range selector of the above mentioned kind, said problem is solved according to the characteristic part of claim 1, by the fact that the gear-shift control is designed as a foot switch located in the foot area of the motor vehicle. It is possible with the foot switch, depending on the position of the gear-range selector, to release manual shifts by a single gear speed or automatic shifts into the gear speed that the control electronics have assessed as optimal. The driver can then fully concentrate on the traffic and leave both hands on the steering wheel during a manual shift or release of a shift into an automatically pre-selected gear.

The publication DE-A 37 17 675 has disclosed a combined gear and gear-range selector having a selector lever movable in two shift gates. Pre-selected positions in one shift gate are for a fully automatic operation, upshift limiting steps and a parking, a reverse gear and a neutral position of the transmission, respectively. The selector lever can be moved via a crossgate into the second shift gate in which the transmission is gradually and manually shifted up or down. The manual shifting of the transmission likewise requires great attentiveness of the driver who can steer the vehicle with only one hand during this operation.

The publication SAE Technical Paper Series 831776 "Automated Mechanical Transmission Controls'-'—Nov. 7 to 19, 1983, pages 2, 6 and 7, has disclosed a combined gear-range selector and gear device which has a selector lever movable in a gate extending in the longitudinal direction of the vehicle. The selectable positions include a position for a manual operation of the transmission in which the gear shift last engaged by the automatic system is preserved. In the manual position, the selector lever can be moved by hand in two different directions across the selector gate whereby the transmission is gradually shifted up or down. In this device, the driver must also seek an adequate position on the selector lever in which a manual shifting of the transmission is possible, his attentiveness is thus diverted from the street traffic. Since the driver must manually carry out the corresponding changes, both hands cannot remain on the steering wheel.

Other advantageous embodiments of the invention are described below.

According to one embodiment of the invention, the foot switch should have a shift rocker movable about a horizontal swivel axis and whose rocker halves cooperate with contacts respectively for shifting up or down, respectively. In this connection it is provided to arrange the shift rocker with its swivel axis extending across the travel direction of the motor vehicle so that the driver releases and upshifts with the tip of his foot on the front half of the rocker, and downshifts with his heel on the rear half of the rocker. The shift rocker can here be designed in a manner such that the driver momentarily traces by a haptic signal that the change-over command has been received by the electronic control unit. In addition, the shift rocker can be provided with means which allow the shift rocker to return to its neutral position after each change-over command before another change-over command is given.

Alternatively, the foot switch can be designed as a pressure switch, the duration of actuation of the pressure switch being determined via a time-function element and synchronized with a desired upshift or downshift. In this way it could be possible, to shift down via a brief touch of the pressure switch while holding the pressure switch in its actuation position longer results in a shift up the transmission.

According to another embodiment, the gear-range selector must have a selector lever movable in a selector gate, said selector lever having positions in said selector gate for a fully automatic operation AS, a manual operation M, an ASM operation in which upon actuation of the foot switch an optimal gear shift determined by an electric gearshift selection is directly engaged, a neutral position N and a reverse speed range R. The motor vehicle is here essentially operated in the positions for fully automatic operation AS, operation with direct shift into an optimal gear speed ASM, and manual operation M, said positions preferably adjacent each other so as to require only a brief actuation path of the selector lever and slight attentiveness of the driver during the selection operation.

In this connection, the selector gate can be given an L-shaped design wherein the positions for fully automatic and manual operations, engagement of the optimal gear and neutral are correspondingly arranged successively in a common selector gate and wherein a position for the reverse gear range is situated at the end of a transverse gate attached thereto. The forward and reverse gear ranges are thus separate from each other and incorrect operations can therefore be prevented. The first selector gate with which the forward positions are coordinated can be situated in the motor vehicle across the travel direction thereof.

In a further development of the invention, in a reverse travel position of the gear-range selector an engagement of the reverse gear can be manually carried out with the foot switch. The reverse gear of the transmission can be engaged only when the motor vehicle is parked and the emission of a shift command from the electronic control unit is conveniently suppressed via a safety device as long as the motor vehicle moves forward.

In addition, the transmission can be switched down by one gear shift into a fully automatic operation by a single actuation of the foot switch. Such a design of the device has the advantage that before overhaul operations and before running over hills, it is possible to shift the transmission down by one gear shift without special cost of circuit. The switch back, can be canceled by repeated actuation of the foot switch or according to a time function.

The invention is not limited to the combination of features of the claims. Other possible logical combinations result to a skilled person from the claims and separate features of the claims in accordance with the existing problem.

For further explanation of the invention, reference is had to the drawing in which an embodiment is shown in simplified form.

In FIG. 1 a transmission, which can be designed as a countershaft or planetary transmission is designated with a 1. The transmission is driven by an internal combustion engine, not specifically designated, and, when designed as a countershaft, an automated master clutch is situated between the internal combustion engine and the transmission 1. The transmission 1 has four gear selection shift cylinders 2 which interact with shift clutches situated in the interior of the transmission 1. With the cylinders 2, the same as other shift or selector cylinders not shown in the drawing, are synchronized solenoid valves 3, a main shift valve 4 and shift valves 5 and 6. The valves 3 to 6 are electrically controlled by an electronic control unit 7. Pressurized air in a pneumatic accumulator or pressure broiler 8 is made available which is fed to the shift cylinders 2 via the electrically controlled valves 3 to 6. A hydraulic fluid can obviously be provided as the actuation means instead of pressurized air.

An electric line 9, attached to the electronic control unit 7, transmits measured values and shift signals to the electronic control unit 7, and pressure sensors are attached to the electric line 9, specifically, one speed sensor 10 for determining the speed of the internal combustion engine, a speed sensor 11 for determining an input speed of the transmission and a speed sensor 12 for determining an output speed of the transmission. The electronic control unit 7 emits shift signals to the valves 3 to 6 via electric line 13.

A steering wheel 14 with a steering column 15 is situated in a driver's cab or a passenger cell of the motor vehicle. An accelerator or drive pedal 16 is also in the foot area of the driver's cab, which, as a load cell, adjusts a throttle valve, not shown, in Otto engines, or a control rack or an injection pump in diesel engines. The drive or accelerator pedal 16 can be directly coupled mechanically to the throttle valve or control rack, or an electronic coupling (E-gas) is provided. In addition, the accelerator pedal 16 works together with a kick-down switch 17 which, in case of a quick actuation of the accelerator pedal 16, releases a reverse shift of the transmission 1 via the electronic control unit 7.

A gear-range selector 18, designed as a console selector and whose selector lever 19 serves for pre-selecting specific travel programs, is also situated in the driver's cab of the motor vehicle. In the drawing, above said selector lever 19, is shown as an L-shaped gate course with which gear-range positions are synchronized, AS for a fully automatic operation, M for a manual operation, ASM for an operation with direct shifting to an optimal gear-range level selected by a shifting system of the electronic control unit 7, N for a neutral position, and R for a reverse travel position.

An indicator 20, likewise connected with the electronic control unit 7, shows the precisely engaged gear of the transmission and, in the ASM position of the selector lever 19 and parallel therewith, a recommended optimal gear speed is indicated.

A gear-shift control 21 is likewise located within the foot area of the driver's cab of the motor vehicle. The gear-shift control 21 is actuatable by the driver with the left foot and is likewise connected with the electronic control unit 7. In the M position, for manual operation of the gear-range selector 18, a gradual upshift or downshift of the transmission 1 is carried out by different manipulations. Two different embodiments of the gear-shift control 21 are shown in the drawing.

According to a first proposal, the gear-shift control 21 must have a shift rocker 22 which has a central swivel axis 23. If the driver steps on a rocker half 22A of the shift rocker, a corresponding closing of a contact, not shown, leads to a shifting up of the transmission 1 by one gear speed. When stepping on a rocker half 22B, the transmission 1 correspondingly shifts down by one gear speed.

If the selector lever 19 of the gear-range selector 18 is in the ASM position, the shift to a gear regarded as optimal by the electronic control unit 7 is also effected by actuating the shift rocker 22. If the transmission 1 is fully automatically controlled as a result of speed and load signals in the position AS of the selector lever 19, the driver can voluntarily interrupt the control for a certain period of time prior to overhaul operations or when running over hills. In this case, the driver must only briefly actuate the gear-shift control 21 and the transmission is then switched by one gear speed. After a certain period of time, this condition of operation of the control device is again automatically canceled or it can be provided that the operation condition be canceled by a repeated stepping on the shift rocker.

In the drawing is shown another possible embodiment of the foot switch, that is, the gear-shift control 21 is shown in broken lines. What is shown here is a pressure switch 24 connected with the electronic control unit 7 via a time-function element 25. Depending on the duration of the actuation of the pressure switch 24, which is determined by the time-function element 25, it is established whether a desired upshift or a desired downshift of the transmission 1 is necessary.

It is to be understood from the drawing that with the gear-shift control 21 designed as foot switch 22 or 24, the driver can, in a simple manner, issue shift commands to the electronic control unit 7 without being distracted from concentrating on driving. It is of a special advantage here that the gear-range selector 18 be separately arranged as a console switch through which no shift commands are issued. As shown by experience, a combination of gear-shift control 21 and gear-range selector 18 within a control lever often actually results in incorrect operations and requires great attentiveness of the driver.

Reference Numerals 1 transmission
2 shift cylinder
3 solenoid valve
4 main shift valve
5 shift valve
6 shift valve
7 electronic control unit
8 pneumatic accumulator
9 electric line
10 speed sensor
11 speed sensor
12 speed sensor
13 electric line
14 steering wheel
15 steering column
16 accelerator pedal
17 kick-down switch
18 gear-range selector
19 selector lever
20 indicator
21 gear-shift control
22 shift rocker
23 swivel axis
24 pressure switch
25 time-function element

We claim:

1. A gear shift control and range selector for a semi-automatically and fully automatically operated transmission (1) of a motor vehicle comprising:
   a gear range selector (18) being interconnected with a control means (7) for sending signals to said control means upon an actuation of said selector (18), upon receipt of signals from said selector (18) said control means determines a desired speed within which said transmission can be shifted up and down by a single gear shift;
   a gear shift foot switch (21) being located in a foot area of the motor vehicle comprising a shift rocker (22) having a horizontal swivel axis (23) dividing said shift rocker (22) into two rocker halves (22a, 22b) that selectively contact and actuate respective contacts, said contacts being interconnected with said control means for sending signals to said control means (7) upon actuation of said contacts; and
   said control means (7) being interconnected with a gear shift means (2–6) for sending signals to said gear shift means (2–6) upon receipt of signals from said contacts, thereby activating said gear shift means (2–6) to shift said transmission up and down.

2. An apparatus according to claim 1, wherein said gear-range selector (18) has a selector lever (19) movable in a selector gate, said selector lever (19) has positions in said selector gate for a fully automatic operation (AS), a manual operation (M), a semi-automatic operation (ASM) in which said control means (7) determines an optimal gear speed and, only upon actuation of said foot switch (21), said control means sends a signal to said gear shift means (2–6) to shift said transmission to said optimal gear speed, a neutral (N), and a reverse speed (R).

3. An apparatus according to claim 2, wherein said selector gate is situated in the motor vehicle across the travel direction thereof.

4. An apparatus according to claim 1, wherein, in a reverse travel position (R) of said gear-range selector (18), said control means (7) sends a signal to said gear shift means (2–6) to shift the reverse gear in response to a signal from said foot switch (21).

5. An apparatus according to claim 1, wherein, in a fully automatic operation position (AS) of said gear-range selector (18), said control means sends a signal to said gear shift means (2–6) to shift said transmission (1) down by one gear in response to a signal from said foot switch (21).

6. A gear shift control (21) and gear range selector (18) for a semi-automatically and fully automatically operable transmission (1) of a motor vehicle comprising:
   a gear shift control foot switch (21) being located in a foot area of the motor vehicle, said foot switch comprising a pressure switch (24) and a time-function element (25) that measures the duration of an activation of said pressure switch (24), said time function element being interconnected with a control means (7) for sending signals corresponding to said duration to said control means (7); and
   said control means (7) being interconnected to a gear shift means (2–6) for sending signals said gear shift means (2–6) upon receipt of signals from said time function element, thereby activating said gear shift means (2–6) to shift said transmission one of up and down depending on said duration.

7. An apparatus according to claim 6, comprising:
   a gear range selector (18) being interconnected with said control means (7) for sending signals to said control means upon an actuation of said selector (18), upon receipt of signals from said selector (18) said control means determines a desired speed within which said transmission can be shifted up and down by a single gear shift;
   wherein said gear-range selector (18) has a selector lever (19) movable in a selector gate, said selector lever (19) has positions in said selector gate for a fully automatic operation (AS), a manual operation (M), an semi-automatic operation (ASM) in which said control means (7) determines an optimal gear speed and, only upon receipt of a signal from said foot switch, sends a signal to said gear shift means (2–6) to shift said transmission to said optimal gear speed, a neutral (N), and a reverse speed (R).

8. An apparatus according to claim 6, comprising:
   a gear range selector (18) being interconnected with said control means (7) for sending signals to said control means upon an actuation of said selector (18), upon receipt of signals from said selector (18) said control means determines a desired speed within which said transmission can be shifted up and down by a single gear shift;
   wherein, in a reverse travel position (R) of said gear-range selector (18), said control means sends a signal to said gear shift means (2–6) to shift the reverse gear in response to a signal from said foot switch (21).

9. A gear shift control and range selector for a semi-automatically and fully automatically operated transmission (1) of a motor vehicle comprising:

a gear shift foot switch (21) being located in a foot area of the motor vehicle, said foot switch comprising a shift rocker (22) having a horizontal swivel axis (23) extending across a direction of travel of the motor vehicle dividing said shift rocker (22) into front and rear halves (22a, 22b) that, upon actuation of the shift rocker by a driver's foot, selectively contact and activate front and rear contacts, said contacts being interconnected with a control means (7) for sending corresponding signals to said control means (7) upon actuation of said contacts; and said control means (7) being interconnected to a gear shift means (2-6) for sending signals to said gear shift means (2-6) upon receipt of signals from said contacts, wherein, when the driver upshifts by pressing with his foot tip on the front rocker half and thereby activating said front contact, said control means sends a signal to said gear shift means (2-6) to shift said transmission up, and when the driver downshifts by pressing with his heel on the rear rocker half and thereby activating of said rear contact, said control means (7) sends a signal to said gear shift means (2-6) to shift the transmission down.

10. A gear shift control and range selector for a semi-automatically and fully automatically operated transmission (1) of a motor vehicle comprising:

a gear range selector (18) being interconnected with a control means (7) for sending signals to said control means upon an actuation of said selector (18), upon receipt of signals from said selector (18) said control means determines a desired speed within which said transmission can be shifted up and down by a single gear shift;

a gear shift foot switch (21) being located in a foot area of the motor vehicle, said foot switch comprising a shift rocker (22) having a horizontal swivel axis (23) extending across a direction of travel of the motor vehicle dividing said shift rocker (22) into two rocker halves (22a, 22b) that, upon actuation of the shift rocker by a driver's foot, selectively contact and activate respective contacts, said contacts being interconnected with said control means (7) for sending corresponding signals to said control means (7) upon actuation of said contacts; and said control means (7) being interconnected to a gear shift means (2-6) for sending signals to said gear shift means (2-6) upon receipt of signals from said contacts, wherein, in response to signals received from said contacts said control means sends signals to said gear shift means (2-6) to shift said transmission (1) up and down;

wherein said gear-range selector (18) comprises a selector lever (19) movable in an L-shaped selector gate formed of a common selector gate and a cross gate located at the end of the common gate, said selector lever (19) has positions spaced along said common selector gate for (i) a fully automatic operation (AS), (ii) a manual operation (M), (iii) a semi-automatic operation (ASM) in which said control means (7) determines an optimal gear speed and, only upon receipt of a signal from said foot switch, sends a signal to said gear shift means (2-6) to shift said transmission to said optimal gear speed, and (iv) a neutral (N), and said selector lever has a position at an end of the cross gate opposite said common gate for a reverse speed (R).

11. A gear shift control and range selector for a semi-automatically and fully automatically operated transmission (1) of a motor vehicle comprising:

a gear range selector (18) being interconnected with a control means (7) for sending signals to said control means upon an actuation of said selector (18), upon receipt of signals from said selector (18) said control means determines a desired speed within which said transmission can be shifted up and down by a single gear shift;

a gear shift foot switch (24) being located in a foot area of the motor vehicle, said foot switch comprising a pressure switch (24), said pressure switch being interconnected to said control means for sending a signal to said control means (7) upon actuation of said foot switch; and said control means (7) being interconnected with a gear shift means (2-6), wherein, in a fully automatic operation position (AS) of said gear-range selector (18), upon an actuation of said foot switch (24) said control means (7) sends a signal to said gear shift means (2-6) to shift said transmission (1) down by one gear and upon a repeated actuation of said foot switch (24) said control means (7) sends a signal to said gear shift means (2-6) to cancel a downshift of said transmission (1).

12. A gear shift control (21) and gear range selector (18) for a semi-automatically and fully automatically operable transmission (1) of a motor vehicle comprising:

a gear range selector (18) being interconnected with a control means (7) for sending signals to said control means upon an actuation of said selector (18), upon receipt of signals from said selector (18) said control means determines a desired speed within which said transmission can be shifted up and down by a single gear shift;

a gear shift control foot switch (21) being located in a foot area of the motor vehicle, said foot switch comprising a pressure switch (24) and a time-function element (25) that measures the duration of an activation of said pressure switch (24), said time function element being interconnected with said control means (7) for sending signals corresponding to said duration to said control means (7);

said control means (7) being interconnected to a gear shift means (2-6) for sending signals to said gear shift means (2-6) upon receipt of signals from said time function element, thereby activating said gear shift means (2-6) to shift said transmission one of up and down depending on said duration; and wherein, in a fully automatic operation position (AS) of said gear-range selector (18), upon an actuation of said foot switch (24) said control means (7) sends a signal to said gear shift means (2-6) to shift said transmission (1) down by one gear.

* * * * *